US012689027B2

(12) United States Patent
Rangasamy et al.

(10) Patent No.: US 12,689,027 B2
(45) Date of Patent: Jul. 21, 2026

(54) METHOD FOR APPLYING A PROTECTIVE LAYER TO AN ALKALI METAL OR ALKALI METAL ALLOY SURFACE, AND ARTICLE COMPRISING SUCH PROTECTIVE LAYER

(71) Applicant: VITO NV, Mol (BE)

(72) Inventors: Vijay Shankar Rangasamy, Mol (BE); Annick Vanhulsel, Mol (BE); Bert Verheyde, Mol (BE); Dirk Vangeneugden, Mol (BE)

(73) Assignee: VITO NV, Mol (BE)

( * ) Notice: Subject to any disclaimer, the term of this patent is extended or adjusted under 35 U.S.C. 154(b) by 628 days.

(21) Appl. No.: 18/258,263

(22) PCT Filed: Dec. 24, 2021

(86) PCT No.: PCT/EP2021/087635
§ 371 (c)(1),
(2) Date: Jun. 19, 2023

(87) PCT Pub. No.: WO2022/136699
PCT Pub. Date: Jun. 30, 2022

(65) Prior Publication Data
US 2024/0038969 A1 Feb. 1, 2024

(30) Foreign Application Priority Data
Dec. 24, 2020 (EP) .................................... 20217291

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0421* (2013.01); *H01M 4/382* (2013.01);
(Continued)

(58) Field of Classification Search
CPC ........... H01M 10/052; H01M 10/4235; H01M 2004/027; H01M 4/0421; H01M 4/0423;
(Continued)

(56) References Cited

U.S. PATENT DOCUMENTS

2014/0272594 A1 9/2014 Safont Sempere et al.
2017/0062829 A1* 3/2017 Ryu .................. H01M 10/0569
(Continued)

FOREIGN PATENT DOCUMENTS

EP 3136475 A1 3/2017
JP 2018113259 A 7/2018

OTHER PUBLICATIONS

International Search Report and Written Opinion of the International Searching Authority from the European Patent Office, in PCT/EP2021/087635 dated Apr. 7, 2022, which is an international application corresponding to this U.S. application.
(Continued)

*Primary Examiner* — Lingwen R Zeng
(74) *Attorney, Agent, or Firm* — Kolitch Romano Dascenzo Gates LLP

(57) ABSTRACT

A method is disclosed for applying a protective layer on at least part of an exposed alkali metal or alkali metal alloy substrate. The method includes activating a gas using a plasma discharge to obtain an activated gas and contacting the exposed surface with the activated gas. A protective layer is formed on at least part of the exposed surface. The gas has a nitrogen-comprising compound such that the protective layer includes at least 60 mol % of a corresponding alkali metal nitrate. The present disclosure is further related to an article including a substrate having a surface including an alkali metal or alkali metal alloy and a protective layer arranged on at least part of the alkali metal or alkali metal alloy surface of the substrate. The protective layer is con-
(Continued)

ductive to ions of the corresponding alkali metal and has at least 60 mol % of a corresponding alkali metal nitrate.

20 Claims, 7 Drawing Sheets

(51) Int. Cl.

| | |
|---|---|
| _H01M 4/38_ | (2006.01) |
| _H01M 4/40_ | (2006.01) |
| _H01M 4/62_ | (2006.01) |
| _H01M 4/02_ | (2006.01) |
| _H01M 4/134_ | (2010.01) |
| _H01M 4/1395_ | (2010.01) |
| _H01M 10/052_ | (2010.01) |
| _H01M 10/42_ | (2006.01) |

(52) U.S. Cl.
CPC .......... _H01M 4/405_ (2013.01); _H01M 4/628_ (2013.01); _H01M 2004/027_ (2013.01); _H01M 4/0423_ (2013.01); _H01M 4/134_ (2013.01); _H01M 4/1395_ (2013.01); _H01M 4/62_ (2013.01); _H01M 10/052_ (2013.01); _H01M 10/4235_ (2013.01)

(58) Field of Classification Search
CPC .... H01M 4/134; H01M 4/1395; H01M 4/366; H01M 4/382; H01M 4/405; H01M 4/62; H01M 4/628
See application file for complete search history.

(56) References Cited

U.S. PATENT DOCUMENTS

| | | |
|---|---|---|
| 2019/0140267 A1 | 5/2019 | Gopalakrishnan Nair et al. |
| 2020/0071835 A1 | 3/2020 | Gallant et al. |

OTHER PUBLICATIONS

Han, Yamiao, et al.; "Improved cycling performances with high sulfur loading enabled by pre-treating lithium anode", Ionics, vol. 22, No. 2, p. 151-157, Sep. 14, 2015.
Yao, Yu-Xing, et al.; "A Compact Inorganic Layer for Robust Anode Protection in Lithium-Sulfur Batteries", InfoMat., 2, pp. 379-388 (2020).

* cited by examiner

30

34
37
36
31
33
32
35

40

44
47
46
41
43
42
45

METHOD FOR APPLYING A PROTECTIVE LAYER TO AN ALKALI METAL OR ALKALI METAL ALLOY SURFACE, AND ARTICLE COMPRISING SUCH PROTECTIVE LAYER

TECHNICAL FIELD

The present disclosure is related to a method for applying a protective layer to a surface of a substrate, the surface comprising an alkali metal or alkali metal alloy. The present disclosure is further related to an article comprising a substrate having an interface surface comprising an alkali metal or alkali metal alloy, and a protective layer arranged on at least part of the surface of the alkali metal or alkali metal alloy. The present disclosure is further related to an electrode comprising the article, in particular an anode, and to a battery (cell) comprising the electrode.

BACKGROUND ART

Recently, there has been a fast growing interest in high energy density batteries and battery cells comprising alkali metal anodes. In particular, lithium (Li) as alkali metal has gained interest as electrode material for anodes, such as for Li-ion and lithium-sulphur (Li—S) batteries and battery cells. The interest in lithium as alkali metal is related to the fact that lithium has the lowest reduction potential of any element, allowing lithium-based batteries to have a very high cell potential. Lithium is the third lightest element and has one of the smallest ionic radii of any single charged ion. These factors allow lithium-based batteries to have high gravimetric and volumetric capacity and power density in comparison to state of the art batteries, for example, batteries comprising intercalation-based anodes, such as carbon anodes.

Alkali metal anodes, such as lithium metal anodes, develop surface films when used in non-aqueous electrochemical cells (electrochemical cells, i.e. battery cells, comprising a non-aqueous electrolyte) because of the reaction of the alkali metal, in particular lithium, with the electrolyte and with materials that move from the cathode to the electrolyte. The obtained surface film is known in the technical field of batteries as the solid electrolyte interphase (SEI) layer.

The SEI-layer is typically conductive to alkali metal ions, such as lithium ions, while mitigating the reactions of the alkali metal, such as the lithium metal, with the electrolyte and its components. However, the SEI-layer can also reduce the discharge voltage and the capacity of the cell, and a SEI-layer with reduced effectiveness or efficiency results often in corrosion of the alkali metal of the metallic alkali anode.

In the case of Li—S batteries, the materials moving from the cathode to the electrolyte mostly comprise electrochemical reduction products originating from the sulphur (sulfur) cathode in the form of polysulphides (polysulfides). The polysulphides are highly reactive, and render the SEI-layer in Li—S batteries and battery cells less effective, up to even ineffective, and thus unstable, which often results in corrosion of the lithium. The reaction of the polysulphides can lead to the so-called polysulphide shuttling and consumption of the electrolyte. This leads in most cases to a decrease of the coulombic efficiency of the Li—S battery.

It is known in the state of the art that the above-mentioned problem of unstable SEI-layers, especially in Li—S batteries, can be reduced significantly by the presence of alkali metal nitrate, such as lithium nitrate ($LiNO_3$) in the electrolyte of the battery cell.

'A compact inorganic layer for robust anode protection in lithium-sulfur batteries', Yu-Xing Yao, Xue-Qiang Zhang et al., InfoMat., 2, pages 379-388 (2020) discloses a wet chemical method wherein a lithium nitrate ($LiNO_3$) layer is deposited on lithium metal by drop-casting an ionic liquid comprising an $NO_3$ ion. The ionic liquid further comprises a $[(FSO_2)_2N]^-$ anion (so-called "FSI-anion"), which reacts with the lithium metal to form a LiF-rich SEI-component in addition to $LiNO_3$. Further, the $LiNO_3$ layer is converted into a lithium nitride ($Li_3N$) layer.

EP 3 136 475 discloses a lithium metal battery comprising a lithium metal anode, a protective layer disposed on the lithium metal anode, a cathode and an electrolyte comprising an organic solvent. The protective layer comprises a polymer, one or more metal salts comprising a Group 1 or a Group 2 element, and a nitrogen-comprising additive. The metal salt and the nitrogen-comprising additive are insoluble in the organic solvent of the electrolyte. The nitrogen-comprising additive can be, amongst others, an inorganic nitrate such as $LiNO_3$, an organic nitrate, an inorganic nitrite, an organic nitrite, or lithium nitride ($Li_3N$). The protective layer is deposited by combining the metal salt(s) and the nitrogen-comprising additive with the organic solvent to form a protective layer-forming composition, which is applied to the lithium metal anode, followed by drying to form the protective layer.

Wet chemical methods to deposit a protective layer on a substrate of an alkali metal or alkali metal alloy have the disadvantage that the liquids used comprise multiple compounds making it difficult to obtain protective layers of sufficiently high purity. Further disadvantages of wet chemical methods are the risk of reaction of the Li metal, contaminations in the formed protective layer, e.g. unwanted side-products, due to contaminations present in the liquid, and a more difficult control of the continuity, homogeneity and uniform thickness of the protective layer upon formation.

US2020/0071835 discloses an article for use as electrode, e.g. anode, in a battery. The article comprises an alkali metal layer and a passivation layer in direct contact with the alkali metal layer. The passivation layer comprises an alkali metal salt and has a thickness of at least 50 nm. The alkali metal salt can be an alkali metal fluoride, such as LiF, or an alkali metal oxide, such as $Li_2O$. Preferably, the molar percentage of the alkali metal salt in the passivation layer is at least 85 mol. %. The passivation layer is formed by reacting the substrate comprising one or more alkali metals with a gas comprising NO, $N_2O$, $NF_3$, $SF_6$, $N_2$, $O_2$ and/or mixtures thereof. The reaction is performed at a temperature between 20° C. and 300° C., and preferably at a temperature equal to or a slightly below the melting temperature of the alkali metal to increase the reactivity between the alkali metal layer and the gas. For example, the melting temperature of lithium metal is around 180° C. in atmospheric conditions.

US2014/0272594 discloses an electrode structure comprising a lithium metal layer, a substantially continuous and substantially nonporous buffer layer disposed on the lithium metal layer, and a substantially continuous and substantially nonporous protective lithium nitride ($Li_3N$) layer disposed on the buffer layer. The buffer layer is conductive to lithium ions and comprises a lithium compound, such as lithium oxide ($Li_2O$). The buffer layer and the protective layer may be formed by means of sputtering, electron beam evaporation, vacuum thermal evaporation, laser ablation, chemical vapor deposition (CVD), thermal evaporation, plasma enhanced chemical vacuum deposition (PECVD), laser enhanced chemical vapor deposition, and jet vapor deposition.

Disadvantages of the above-mentioned "dry" methods— i.e. methods not using a liquid such as a solvent as is done in wet chemical methods, are, amongst others, the complexity of the process (i.e. two-step process including formation of a buffer layer followed by formation of a passivation layer) and the elevated temperature to which the substrate is heated, causing a significant energy consumption.

SUMMARY

The present disclosure aims to overcome one or more of the above drawbacks. It is an aim of the present disclosure to provide an improved method for passivating a surface comprising an alkali metal or alkali metal alloy, which, amongst other advantages, involves a reduced number of processing steps, is less complex and reduces the energy consumption.

The present disclosure further aims to provide an article, comprising an interface surface comprising an alkali metal or alkali metal alloy and a protective layer arranged on at least part of the surface of the alkali metal or alkali metal alloy, wherein the protective layer, amongst other advantages, is of simpler construction than the protective layers of the state of the art and/or has improved properties, in particular for use as an electrode. The present disclosure further aims to provide an electrode material comprising the article, and an electrode, such as an anode, comprising the electrode material.

According to a first aspect of the present disclosure, there is therefore provided a method for applying a protective layer on a surface of an alkali metal or alkali metal alloy as set out in the appended claims. A method as described herein provides a substrate comprising an exposed alkali metal or alkali metal alloy surface. The method comprises the steps of (i) activating a gas comprising a nitrogen-comprising compound by means of a plasma discharge, to obtain an activated gas, and (ii) contacting the exposed surface with the activated gas, wherein a protective layer is formed on at least part of the exposed surface. Contacting the exposed surface with the activated gas is carried out in such a way that the protective layer comprises at least 60 mol % of a corresponding alkali metal nitrate, preferably at least 70 mol %, at least 80 mol %, or at least 90 mol % of a corresponding alkali metal nitrate. In a preferred embodiment, the nitrogen-comprising compound comprises nitrous oxide (N₂O). The mol % can be determined by XPS.

The gas that is activated by means of a plasma discharge can refer to a gas or gas mixture in which the plasma discharge is generated, such as a carrier gas. Alternatively or in addition, the gas that is activated by means of a plasma discharge can refer to a precursor, in particular one or more of a precursor gas, a vapor, an aerosol, or combinations thereof, which is introduced in a plasma discharge or in an afterglow resulting from the plasma discharge. According to a preferred embodiment, the gas that is activated by means of a plasma discharge refers to the gas or gas mixture in which the plasma discharge is generated. Advantageously, the gas that is activated by means of the plasma discharge is a gas comprising nitrous oxide (N₂O). Advantageously, in methods of the present disclosure, no liquid precursors are utilized.

Advantageously, the gas comprises N₂O in an amount between 0.05 vol. % and 99.95 vol. %, such as between 0.05 vol. % and 95 vol. %, between 0.1 vol. % and 50 vol. %, between 0.2 vol. % and 10 vol. %, or between 0.25 vol. % and 2.5 vol. %. Advantageously the gas comprises nitrogen (N₂). According to a preferred embodiment, the gas is a gas mixture comprising N₂O and N₂.

Advantageously, the gas comprises oxygen (O₂) in an amount equal to or lower than 0.5 vol. %, such as equal to or lower than 0.25 vol. %, equal to or lower than 0.1 vol. %, equal to or lower than 0.075 vol. %, preferably equal to or lower than 0.05 vol. %, equal to or lower than 0.025 vol. %, equal to or lower than 0.01 vol. %, equal to or lower than 0.0075 vol. %, more preferably equal to or lower than 0.005 vol. %.

Advantageously, the gas that is activated substantially consists of covalent bonds between nitrogen and nitrogen and/or between nitrogen and oxygen. In other words, the gas that is activated advantageously comprises no other covalent bonds than nitrogen-nitrogen bonds and nitrogen-oxygen bonds.

Advantageously, the alkali metal is lithium (Li) and the corresponding alkali metal nitrate is lithium nitrate (LiNO₃). Advantageously, the alkali metal alloy comprises at least 5 wt. % lithium, preferably at least 7.5 wt. %, more preferably at least 10 wt % lithium (Li) based on the total weight of the alkali metal alloy. Advantageously, the corresponding alkali metal nitrate is lithium nitrate (LiNO₃).

Advantageously, the temperature of the exposed alkali metal or alkali metal alloy surface in step (ii), during contact with the activated gas, is equal to or lower than 700° C., preferably equal to or lower than 180° C., more preferably equal to or lower than 120° C., most preferably equal to or lower than 100° C., in particular equal to or lower than 75° C.

Advantageously, the plasma discharge is an atmospheric pressure plasma discharge The plasma discharge can be a dielectric barrier plasma discharge (DBD), a microwave plasma discharge, a radio frequency plasma discharge, an inductive coupled plasma discharge, an arc plasma discharge, or a DC plasma discharge. Advantageously, the plasma discharge has a plasma power density between 20 Wh/m² and 50 Wh/cm², preferably between 100 Wh/m² and 2 Wh/cm², more preferably between 1000 Wh/m² and 1 Wh/cm², most preferably between 1500 Wh/m² and 5000 Wh/m² for the treated surface area.

Advantageously, when the plasma discharge is an atmospheric pressure plasma discharge, the method is carried out in a plasma equipment mounted in a closed environment. The closed environment can comprise an inert gas, for example nitrogen (N₂), helium (He), argon (Ar), or a mixture of two or more thereof. The pressure of the closed environment is preferably above atmospheric pressure, preferably between 1 mbar and 100 mbar above atmospheric pressure, more preferably between 1 mbar and 50 mbar above atmospheric pressure, most preferably between 1 mbar and 10 mbar above atmospheric pressure. In such cases the atmospheric pressure plasma discharge can occur at the indicated pressures slightly above atmospheric pressure.

According to a second aspect of the present disclosure, there is provided an article as set out in the appended claims. An article as described herein comprises a substrate having an interfacial surface comprising an alkali metal or alkali metal alloy, and a protective layer arranged on the alkali metal or alkali metal alloy interfacial surface. The interfacial surface hence advantageously forms the (direct) interface between the substrate and the protective layer. Advantageously, the protective layer is conductive to ions of the corresponding alkali metal. Advantageously, the protective layer comprises at least 60 mol % of a corresponding alkali metal nitrate, preferably at least 70 mol %, at least 80 mol %, or at least 90 mol % of a corresponding alkali metal nitrate. The mol % can be determined by XPS.

Advantageously, the protective layer comprises at most 40 mol % of a corresponding alkali metal oxide, such as at most 30 mol %, preferably at most 20 mol %, at most 10 mol %, more preferably at most 5 mol %, and most preferably at most 3 mol % of a corresponding alkali metal oxide. The mol % can be determined by XPS.

Advantageously, the protective layer has a thickness between 5 nm and 500 μm, such as between 10 nm and 100 μm, between 50 nm and 50 μm, between 250 nm and 25 μm, or between 500 nm and 15 μm.

Advantageously, the alkali metal is lithium (Li) and the corresponding alkali metal nitrate is lithium nitrate ($LiNO_3$). Advantageously, the alkali metal alloy comprises at least 5 wt. % lithium (Li), preferably at least 7.5 wt. % lithium, more preferably at least 10 wt. % lithium based on the total weight of the alkali metal alloy, and the corresponding alkali metal nitrate is lithium nitrate ($LiNO_3$).

Advantageously, the protective layer substantially consists of the corresponding alkali metal nitrate and comprises substantially no impurities, as measured by XPS. Advantageously, with "substantially no impurities" is meant that the amount of impurities is below the detection limit of XPS. The impurities can be organic impurities, inorganic impurities, or a combination thereof.

The article can be obtained by means of the method of the first aspect of the present disclosure. Alternatively, the article can be obtained by means of other methods, such as thermal methods or wet chemical methods using water and/or a solvent.

According to a third aspect of the present disclosure, there is provided an electrode comprising the article of the second aspect of the present disclosure. The electrode can be an anode.

According to a yet a further aspect of the present disclosure, there is provided a battery cell comprising the electrode according to the third aspect, in particular as an anode.

Advantageously, the battery cell has a Coulombic efficiency of at least 85%, preferably at least 90% after 150 charging/discharging cycles.

One of the advantages of the method of the present disclosure, compared to prior art methods using dry technologies (methods that do not use any water or solvent), is that the method is less complex and minimizes the risk of exposing the substrate to severe conditions which otherwise would adversely affect the substrate surface. For example, the method comprises less process steps. The method of the present disclosure advantageously allows to apply a protective layer directly on the alkali metal or alkali metal alloy surface of a substrate without the need for a buffer layer. The method can advantageously be carried out at low temperatures and is low on energy consumption. The method of the present disclosure further allows controlling the formation of the protective layer, which results in a protective layer that allows to protect the electrode in a more efficient way. The method of the present disclosure allows to control the parameters of the deposition process more accurately compared to prior art methods, which allows a better control of the composition of the protective layer.

The application of the protective layer on the surface of an alkali metal or alkali metal alloy can for example have the following advantages compared to prior art protective layers and electrodes, without being limited thereto:

reduction of number of interfaces between anode material and electrolyte, reduction of the total thickness of the protective layer, improvement of the interface between the substrate of alkali metal or alkali metal alloy and the protective layer, which results in lower interface resistance and lower overall cell resistance, and enabling that a desired compound is formed as protective layer; particularly in case of electrodes for battery cells, wherein the desired compound is a compound that otherwise would need to be added to the electrolyte.

BRIEF DESCRIPTION OF THE DRAWINGS

Aspects of the present disclosure will now be described in more detail with reference to the appended drawings, wherein same reference numerals illustrate same features and wherein.

DETAILED DESCRIPTION

Figure 1:
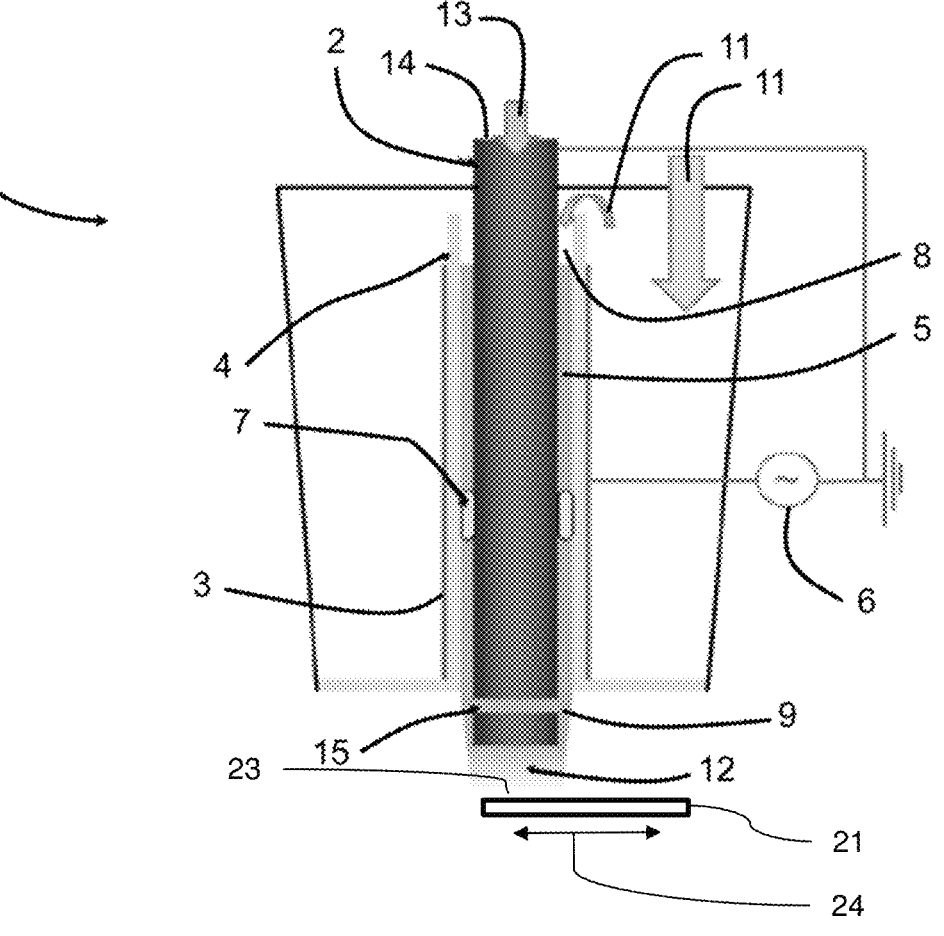
FIG. 1 represents schematically a plasma discharge equipment that can be used in the present disclosure.

According to an aspect of the present disclosure, a method is provided for applying a protective layer on an exposed surface of an alkali metal or alkali metal alloy containing substrate.

The alkali metal can be any element from Group 1 (Ia) of the periodic system of elements (PSE), i.e. lithium (Li), sodium (Na), potassium (K), rubidium (Rb), cesium (Cs) or Francium (Fr), or a combination of two or more thereof. Preferably, the alkali metal is lithium (Li), and the corresponding alkali metal nitrate is lithium nitrate ($LiNO_3$). The alkali metal can be sodium (Na), and the corresponding alkali metal nitrate is sodium nitrate ($NaNO_3$). The alkali metal alloy can contain any element from Group 1 (Ia) of the periodic system of elements (PSE), i.e. lithium (Li), sodium (Na), potassium (K), rubidium (Rb), cesium (Cs) or Francium (Fr), or a combination of two or more thereof. Preferably, the alkali metal alloy comprises lithium (Li). The alkali metal alloy can further comprise one or more other elements, such as elements from Group 2 of the PSE, for example magnesium (Mg), and/or elements from Group 3 of the PSE, for example aluminum (Al), and/or elements from Group 4 of the PSE, for example silicium (silicon) (Si).

The substrate comprises or may consist of an alkali metal or alkali metal alloy. In particular, the substrate comprises an exposed surface comprising, or consisting of the alkali metal or alkali metal alloy. The exposed surface comprising the alkali metal or alkali metal alloy is also referred to as 'the exposed alkali metal or alkali metal alloy surface' throughout the following description. The exposed surface can comprise other elements or compounds, in particular oxides of the alkali metal or oxides of the elements of the alkali metal alloy. A protective layer will be applied on the exposed surface as described herein.

A pre-treatment can be performed to the substrate, in particular to the alkali metal or alkali metal alloy surface that will be exposed to the activated gas. The pre-treatment can comprise one or more of a reductive pre-treatment and a cleaning. The pre-treatment can be performed by means of a plasma discharge, or by means of another method, such as a method using one or more liquids. It will however be appreciated that methods as described herein do not require a pre-treatment of the exposed surface prior to applying the protective layer.

A post-treatment can be performed to the a protective layer, in particular a thermal post-treatment, such as a drying step.

According to the present disclosure, the protective layer is applied on the exposed surface by a plasma treatment technique. A gas is activated by means of a plasma discharge, which can be a low pressure plasma discharge (at sub-atmospheric pressure levels), or preferably an atmospheric pressure plasma discharge. The activated gas is brought in contact with the exposed surface. The activated gas reacts with the alkali metal on the exposed surface and thereby forms a reaction compound on the exposed surface, which constitutes the protective layer. According to an aspect of the present disclosure, the reaction compound is or comprises an alkali metal nitrate.

An atmospheric pressure plasma discharge can be obtained by means of a direct current (DC) excitation (DC plasma discharge) or an alternating current (AC) excitation (AC plasma discharge), by inductively coupled plasma excitation, by excitation by means of radio waves or microwaves (radio frequency or microwave plasma discharge), or by other excitation means known in the field. Without being limited thereto, an atmospheric pressure plasma discharge by means of DC excitation can be an electric arc discharge (arc plasma discharge). An atmospheric pressure plasma discharge by means of AC excitation can be, without being limited thereto, a corona discharge, a dielectric barrier discharge (DBD), a piezoelectric direct discharge, or a plasma jet.

To obtain a sufficient amount of reactive species in the activated gas obtained from a plasma discharge, a plasma power density of between 20 $Wh/m^2$ and 50 $Wh/cm^2$, such as between 50 $Wh/m^2$ and 25 $Wh/cm^2$, between 75 $Wh/m^2$ and 10 $Wh/cm^2$, preferably between 100 $Wh/m^2$ and 2 $Wh/cm^2$, such as between 500 $Wh/m^2$ and 1.5 $Wh/cm^2$, more preferably between 1000 $Wh/m^2$ and 1 $Wh/cm^2$, most preferably 1500 $Wh/m^2$ and 5000 $Wh/m^2$ for the treated surface is advantageously used. Such power densities are particularly preferred for a dielectric barrier discharge (DBD) plasma treatment.

Referring to FIG. 1, an apparatus 1 for performing an exemplary embodiment of the method of the present disclosure is represented. The apparatus 1 is an atmospheric pressure plasma jet apparatus (or plasma torch), wherein the plasma discharge is a dielectric barrier discharge (DBD). The apparatus 1 advantageously comprises a first electrode 2 and a second electrode 3. The second electrode 3 can be arranged coaxial with the first electrode 2. By way of example, the first electrode 2 is arranged centrally and the second electrode 3 can be arranged to surround the first electrode 2 and being coaxial with the first electrode 2. An electrical insulator 4 is coaxially disposed between the first, central electrode 2 and the second, outer electrode 3. A discharge lumen 5 in which a plasma discharge occurs is provided between the electrical insulator 4 and the first electrode 2. In this case the second electrode 3 acts as a high voltage electrode, and the first electrode 2 can be grounded. Alternatively, the discharge lumen 5 is provided between the electrical insulator 4 and the second electrode, and the first electrode 2 can be the high voltage electrode. The high voltage (HV) electrode refers to the electrode connected to a radio frequency power source 6 as known in the art. It will be appreciated that the first and second electrodes can alternatively have a planar configuration, or any other suitable configuration, such as elliptical, with the electrical insulator interposed between them and spaced apart from one of the electrodes to define the discharge lumen.

The electrical insulator 4 may be a dielectric medium, such as Al2O3. Advantageously, a spacing between an outer surface of the first electrode 2 (or of the second electrode 3 as the case may be) and an inner surface of the electrical insulator 4 defining the discharge lumen 5 is between 0.1 mm and 10 mm, such as between 1 and 5 mm, preferably around 1.5 mm. The distance can be controlled by ceramic spacers 7. The discharge lumen 5 extends between a distal end 8 and a proximal end 9, forming an outlet.

A supply opening disposed at the distal end 8 of the discharge lumen 5 allows for supplying a carrier gas 11 to the discharge lumen 5. The carrier gas is advantageously an inert gas, such as nitrogen, helium or argon, or a combination of two or more thereof. Preferably, the carrier gas comprises nitrogen. More preferably, the carrier gas essentially consists of nitrogen. When the power source 6 is operated, a plasma discharge is made to occur in the discharge lumen 5, which excites the carrier gas 11 in the discharge lumen. The plasma-excited carrier gas leaves the discharge lumen 5 at the proximal end 9. A so-called afterglow zone 12 can be formed in a region adjacent to and/or downstream of the proximal end 9. A plasma-assisted treatment can occur either in the plasma discharge lumen 5 or in the afterglow zone 12.

A precursor 13, in particular in gaseous, vapor or aerosol form, can be applied through a supply opening 14, either directly into the plasma discharge chamber (discharge lumen 5), or into the afterglow zone 12. By way of example, the central, first electrode 2 is hollow having an internal lumen. The precursor 13 is introduced through the internal lumen of the grounded electrode 2 and egresses in the afterglow zone 12, where it can be activated by the plasma-excited carrier gas. Subsequently, the activated precursor reacts with the exposed surface of a substrate to be treated.

A slit opening 15 can optionally be provided between the proximal end 9 and the plasma afterglow zone 12. The slit opening 15 allows to control the supplied amount of precursor 13. The slit opening 15 can have a width of between 0.1 mm and 5 mm, such as between 0.2 mm and 2.5 mm, between 0.25 mm and 1 mm, preferably for the method of the present disclosure around 0.5 mm. The substrate 21 having a surface 23 comprising an alkali metal or alkali metal alloy can be arranged in the afterglow zone 12 by means of a substrate holder 24, such as a plate or a grid or a tray, whereon or wherein the substrate 21 is placed. The substrate holder can be moved relative to the plasma jet apparatus 1 to apply the plasma treatment to the entire surface 23. Preferably, the exposed surface 23 is oriented towards the proximal end 9 of the discharge lumen 5 to ensure an optimal contact with the activated gas in the afterglow zone 12.

According to the present disclosure, use is made of a gas comprising, or consisting essentially of, a nitrogen-comprising compound. A wide variety of nitrogen-comprising compounds may be used, and the nitrogen comprising compound may be organic or inorganic. Examples of organic nitrogen comprising compounds include primary, secondary and tertiary amines, amides, carbamides, imines, nitriles or cyano compounds, nitro, nitroso or nitrosonium compounds, azo or diazo compounds, hydrazines, hydrazides, hydrozones, azides, aziridines, isocyanates and isocyanides. Examples of inorganic nitrogen comprising compounds include $NH_3$, $N_2$, NO, $NO_2$, $HNO_2$, $HNO_3$, $N_2H_4$, and $N_2O$, but preferably a gas comprising nitrous oxide ($N_2O$) is used. The gas, e.g. a nitrous oxide ($N_2O$) comprising gas, is activated by means of the plasma discharge. According to an embodiment, the gas can refer to the combination (or mixture) of a gas wherein a plasma discharge is generated and a precursor gas as described above. Preferably, the gas mixture comprises nitrogen ($N_2$) and nitrous oxide ($N_2O$). The gas mixture can also comprise one or more inert gases, for example helium (He) or argon (Ar) in addition to the nitrogen-comprising compound. Alternatively, e.g. in case of a low pressure plasma, the gas activated by the plasma discharge can essentially consist of $N_2O$.

Preferably, the gas comprises $N_2O$ in an amount between 0.05 vol. % and 99.95 vol. %, such as between 0.05 vol. % and 95 vol. %, preferably between 0.1 vol. % and 75 vol. %, more preferably between 0.1 vol. % and 50 vol. %, for example between 0.15 vol. % and 25 vol. %, between 0.2 vol. % and 10 vol. %, or between 0.25 vol. % and 2.5 vol. %. When the gas comprises less than 0.05 vol. % $N_2O$, the amount of oxygen radicals in the activated gas, obtained from activation of the $N_2O$, may be too low to contribute to a useful formation of the alkali metal nitrate. A too high amount of oxygen (radicals) may lead to excess heating of the substrate of the alkali metal or alkali metal alloy, eventually up to the melting temperature of the alkali metal, which may lead to deformations and defects.

It has surprisingly been found that the use of nitrous oxide in the plasma activated gas allows for obtaining chemical reactions on the exposed surface which privilege the formation of alkali metal nitrates over the formation of alkali metal oxides and alkali metal nitrides. Such a behavior was not observed when using a gas mixture of e.g. nitrogen and oxygen. The presence of a layer comprising alkali metal nitrates on the exposed surface is advantageous, since it allows conduction of alkali metal ions through the layer while protecting the alkali metal in the underneath substrate.

It has also been found that the presence of a layer comprising alkali metal nitrates on the exposed surface allows to protect the alkali metal in the underneath substrate against exposure to external agents, in particular when the alkali metal or alkali metal alloy comprising substrate is used as an electrode in a battery or battery cell since the alkali metal or alkali metal alloy can be protected against unwanted reactions with the electrolyte.

Advantageously, using a $N_2O$ containing gas, such as in an amount as described above, allows for forming reaction compounds on the exposed alkali metal or alkali metal alloy surface, which comprise the alkali metal nitrate in an amount of at least 20 mol %, preferably at least 25 mol %, at least 30 mol %, at least 40 mol %, at least 50 mol %, at least 60 mol %, at least 70 mol %, at least 75 mol %, at least 80 mol %, at least 85 mol %, at least 90 mol %, or at least 95 mol % of the alkali metal nitrate. Mol % is expressed with respect to the composition of the protective layer, as deduced from the surface elemental composition measured by X-ray photoelectron spectroscopy (XPS).

The gas (or gas mixture) can further comprise impurities, such as but not limited to oxygen ($O_2$), water vapor, $CO_2$, CO, $NH_3$, $H_2$, $NO_2$, NO, $SO_2$, $SO_3$, Ar, He, Ne, HF, HCl, or any other conventional impurities present in industrially available gases. Advantageously, such impurities are present in the gas in an amount equal to or lower than 5000 ppm, for example equal to or lower than 1000 ppm, 500 ppm, 200 ppm, 175 ppm, 150 ppm, 125 ppm, preferably equal to or lower than 100 ppm, such as equal to or lower than 75 ppm, more preferably equal to or lower than 50 ppm, such as equal to or lower than 25 ppm, most preferably equal to or lower than 10 ppm.

According to a preferred embodiment, the gas is a gas mixture comprising $N_2O$ in an amount between 0.05 vol. % and 99.95 vol. %, further comprising $N_2$, and comprising at most 50 ppm of impurities, for example, or in particular, $O_2$ and water vapor.

The power source is preferably arranged to provide an AC or DC voltage, between 0.5 kV and 50 kV, such as between 1 kV and 10 kV. The voltage may be applied to either one, or both of the first and second electrodes by the power source as a continuous wave, i.e. the plasma discharge may be a continuous wave discharge. Alternatively, the voltage may be applied to either one, or both of the first and second electrodes by the power source as a pulsed wave, i.e. the plasma discharge may be a pulsed plasma discharge.

The frequency of the voltage applied by the power source may be from kHz to GHz, for example 18 kHz or 13.56 MHz.

The exposed surface comprising the alkali metal or alkali metal alloy can be contacted with the activated gas simultaneously with activation of the gas by the plasma discharge in a so-called direct plasma treatment of the exposed alkali metal or alkali metal alloy surface. To this end, the surface of the alkali metal or alkali metal alloy can be arranged in a plasma discharge chamber. The substrate can be arranged in the discharge chamber by means of a substrate holder whereon or wherein the substrate is placed, such as a plate or a grid or a tray.

Alternatively, the exposed surface comprising the alkali metal or alkali metal alloy may be contacted subsequent to activating the gas by the plasma discharge in a so-called indirect plasma treatment, remote plasma treatment, or afterglow plasma treatment of the alkali metal or alkali metal alloy exposed surface. Such indirect plasma treatment may be used when a more gentle plasma process is required, since the energy of the plasma excited gas which has left the plasma discharge chamber is generally lower than the energy of a gas in the plasma discharge chamber.

Advantageously, the step of contacting the exposed surface with the activated gas is performed at elevated temperature. Preferably, the exposed surface of the alkali metal or alkali metal alloy is at an elevated temperature during the contacting step. A suitable elevated temperature comprises temperatures between room temperature, e.g. 25° C. or 30° C., up to 700° C., such as equal to or lower than 700° C., equal to or lower than 600° C., equal to or lower than 500° C., equal to or lower than 400° C., equal to or lower than 300° C., equal to or lower than 250° C., equal to or lower than 200° C., preferably equal to or lower than 180° C., for example equal to or lower than 150° C., equal to or lower than 120° C., equal to or lower than 100° C., equal to or lower than 90° C., more preferably equal to or lower than 75° C., or even equal to or lower than 60° C.

Advantages of performing the contacting step to an exposed surface of the alkali metal or alkali metal alloy at elevated temperature are, without being limited thereto, a reduction of the total treatment time, kinetically or thermodynamically preferred reactions resulting in optimized performance, a reduction of the risk of unwanted condensation of gas species on the exposed surface, and enhanced release of contaminants from the substrate.

The exposed surface of alkali metal or alkali metal alloy may be heated prior to the contacting step to ensure that the required or pre-set temperature is reached at the latest at the start of the contacting step. During the contacting step, the exposed alkali metal or alkali metal alloy surface may be heated or may be cooled to maintain the required temperature.

The plasma apparatus can be mounted in a closed environment (not shown). Such a closed environment is a so-called glove-box set-up. The closed environment is advantageously filled with an inert gas, such as nitrogen, helium or argon, or a mixture of two or more thereof. Preferably the closed environment is filled with $N_2$. The closed environment allows to reduce the presence of unwanted impurities in the discharge lumen. Impurities present in the discharge lumen can lead to the formation of impurities in the protective layer on the exposed surface. Impurities in the discharge lumen can also oxidize the exposed surface, which may also lead to impurities being present in the protective layer applied to the exposed surface.

Impurities present in the discharge lumen can be reactive components, i.e. reactive impurities, such as, but not limited to, oxygen, carbon dioxide ($CO_2$), water vapor, and other reactive molecules comprising one or more oxygen atoms (but not $N_2O$).

Advantageously, the closed environment is at a pressure between 1 mbar and 100 mbar above atmospheric pressure. The pressure of the closed environment can be between 1 mbar and 75 mbar above atmospheric pressure, such as between 1 mbar and 50 mbar above atmospheric pressure, between 1 mbar and 25 mbar above atmospheric pressure, between 1 mbar and 20 mbar above atmospheric pressure, between 1 mbar and 15 mbar above atmospheric pressure, preferably between 1 mbar and 10 mbar above atmospheric pressure, more preferably between 1 mbar and 5 mbar above atmospheric pressure. The inventors have discovered that a slight over-pressure of at most 50 mbar allows to limit the presence of impurities in the plasma discharge to a value that is sufficiently low for the method of the present disclosure to be carried out efficiently.

It is possible to mount the plasma jet apparatus 1 on an XY table and move the apparatus 1 over the exposed surface to be treated. Alternatively, the substrate can be placed on an XY table and moved underneath the plasma jet apparatus 1. By so doing, larger surfaces can be treated, and/or a treatment in multiple passes can be performed.

Each unit portion of the exposed surface is advantageously contacted with the activated gas for a total treatment time of between 0.1 seconds and 24 hours, between 1 seconds and 12 hours, such as between 2 seconds and 6 hours, between 5 seconds and 5 hours, between 30 seconds and 2 hours, preferably between 1 minutes and 1 hour, for example between 5 minutes and 45 minutes, more preferably between 10 minutes and 30 minutes, such as around 15 minutes. The total treatment time can refer to a single pass or multi-pass treatment and refers to a unit surface area that can be treated at once by the activated gas.

The treatment time depends on, without being limited thereto, the thickness of the protective layer to be obtained, the composition of the gas, the gas flow, whether the exposure of the substrate's surface is a direct or indirect exposure, the configuration of the plasma discharge equipment (such as distance between electrodes, if electrodes are present), and the type of plasma discharge (atmospheric or low pressure, AC or DC or other, pulsed wave or continuous wave, etc.), the plasma discharge power, or the temperature of the exposed alkali metal or alkali metal alloy surface.

Methods of the present disclosure may comprise repeating the steps of activating a gas by plasma discharge and contacting the exposed surface with the activated gas multiple times, for example 1 to 1000 times, such as 2 to 500 times, 3 to 250 times, 4 to 100 times, or 5 to 50 times. Whether the steps are repeated or not, and if they are repeated, the number of repetitions, depends, without being limited thereto, on the targeted thickness of the protective layer, the characteristics of the exposed surface of the alkali metal or alkali metal alloy (composition, dimensions) of the substrate, the parameters of the plasma discharge, such as power density and treatment time, and the composition of the gas.

According to another aspect of the present disclosure, an article, comprising a substrate with an interfacial surface comprising an alkali metal or alkali metal alloy, and a protective layer arranged on at least part of the interfacial surface is provided. The protective layer on the interfacial surface of the alkali metal or alkali metal alloy, the alkali metal and the substrate are as defined above in relation to the method of the present disclosure.

Advantageously, the protective layer is conductive to ions of the alkali metal comprised in the alkali metal or alkali metal alloy surface of the substrate. For example, when the alkali metal is lithium (Li), the protective layer advantageously is conductive to lithium ions.

Preferably, the protective layer is impermeable to electrons. Preferably, when the article is used as an electrode, preferably as an anode, in a battery or battery cell, the protective layer is passivated to reactions with the electrolyte.

Figure 2:
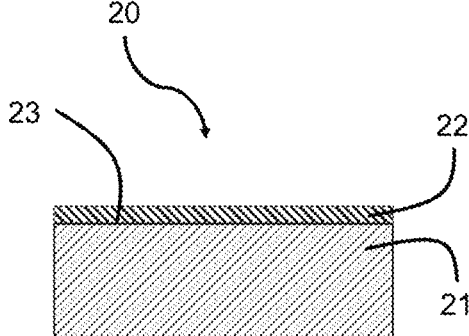
FIG. 2 represents schematically an article of the present disclosure.

Referring to FIG. 2, an article 20 according to aspects as described herein comprises a substrate 21 comprising an interfacial surface 23 and a protective layer 22 arranged thereon. The interfacial surface 23 forms the interface between the bulk substrate 21 and the protective layer 22. Hence, the protective layer is advantageously directly arranged on the interfacial surface 23, without any other interposed layer between them.

Advantageously, the protective layer 22 comprises at least 20 mol % of a corresponding alkali metal nitrate, such as at least 25 mol %, at least 30 mol %, at least 40 mol %, at least 50 mol %, preferably at least 60 mol %, for example at least 70 mol %, at least 70 mol %, at least 80 mol %, at least 90 mol % or at least 95 mol % of a corresponding alkali metal nitrate. With 'corresponding alkali metal nitrate' is meant an alkali metal nitrate wherein the alkali metal is the same as the alkali metal comprised in the surface of the alkali metal or alkali metal alloy. For example, when the alkali metal of the surface of alkali metal or alkali metal alloy is lithium (Li), the alkali metal nitrate is lithium nitrate ($LiNO_3$). For example, when the alkali metal alloy comprises lithium, the corresponding alkali metal nitrate is lithium nitrate ($LiNO_3$). Advantageously, the alkali metal alloy comprises at least 5 wt. % lithium, at least 7.5 wt. % lithium, preferably at least 10 wt. % lithium based on the total weight of the alkali metal alloy.

Advantageously, the protective layer comprises at most 40 mol % of a corresponding alkali metal oxide, such as at most 20 mol %, at most 15 mol %, preferably at most 10 mol %, more preferably at most 5 mol %, most preferably at most 3 mol % of a corresponding alkali metal oxide. Preferably, the protective layer comprises substantially no corresponding alkali metal oxide, i.e. the alkali metal oxide is absent or present in an amount below the detection limit of XPS. With 'corresponding alkali metal oxide' is meant an alkali metal oxide wherein the alkali metal is the same as the alkali metal comprised in the surface of alkali metal or alkali metal alloy. For example, when the alkali metal of the substrate surface of the alkali metal or alkali metal alloy is lithium (Li), the alkali metal oxide is lithium oxide ($Li_2O$).

Advantageously, the protective layer 22 comprises substantially no impurities. The impurities can be organic impurities, inorganic impurities, or a combination thereof. Organic impurities can refer to carbon-containing compounds, such as compounds that can be expected when using a chemical precursor that typically comprises functional groups based on carbon. Inorganic impurities can refer to inorganic compounds other than alkali metal nitrates. With "substantially no impurities", it is meant that the amount of such compounds is below the detection limit of XPS. Advantageously, the XPS measurements refer to the surface elemental composition measured at the (exposed) surface of the protective layer 22 opposite to the interface surface 23.

Advantageously, the protective layer 22 has a thickness between 5 nm and 500 μm, such as between 5 nm and 250 μm, between 10 nm and 100 μm, between 20 nm and 90 μm, between 25 nm and 75 μm, between 50 nm and 50 μm, between 100 nm and 40 μm, between 200 nm and 30 μm, between 250 nm and 25 μm, between 500 nm and 15 μm, between 1 μm and 15 μm, between 2 μm and 15 μm, more preferably between 5 μm and 10 μm. The thickness can be measured by means of scanning electron microscopy (SEM) of the cross-section of the article. For example, a FEI NovaSEM 450 scanning electron microscope can be used. The cross-section can be made by slicing the article by means of a ceramic knife. The sliced samples can then be positioned on SEM sample holders placed in a transfer module (brand: Kammrath Weiss Gmbh) to avoid any contamination with moisture and oxygen from the atmosphere during transfer to the scanning electron microscope.

The protective layer 22 advantageously is a continuous layer, e.g. forming a complete covering of the exposed surface 23, without non-covered areas, such as pinholes. The protective layer is advantageously nonporous. When used in a battery or battery cell as anode, an article comprising a continuous protective layer allows to protect the alkali metal or alkali metal alloy surface of the substrate from the electrolyte in an efficient manner, allowing for transfer of alkali metal ions and at the same time being impermeable to the electrolyte and to electrons.

The continuity of the protective layer can be evaluated by means of scanning electron microscopy (SEM) of the article, in particular a visual inspection of the surface onto which the protective layer is applied. The visual inspection of the SEM image of the surface onto which the protective layer is applied can be combined with a thickness measurement of the layer, as described above, by SEM-imaging of the cross-section of the article, and/or with an evaluation of the surface roughness by means of atomic force microscopy (AFM), and/or with a chemical analysis of the composition of the surface onto which the protective layer is applied. A chemical analysis of the composition of the protective layer can also be performed by means of X-Ray Diffraction (XRD). An example of a system to study the X-ray diffraction is a PANalytical Empyrean diffractometer system. The measurements are typically performed with Co Ka radiation and a 0.76 mm divergence slit. The 2θ scan range is typically 5° to 120°. The article under evaluation is typically enclosed in a holder comprised of Kapton film to seal the sample and to protect it from exposure to air and moisture while allowing X-rays to pass through. Alternatively, or additionally, the continuity of the protective layer can be evaluated by plating/stripping testing of the article (see further in Example 4).

The article 20 can be obtained by any method allowing to obtain an article comprising a substrate 21 having a surface comprising an alkali metal or alkali metal alloy, and a protective layer 22 arranged on at least part of an alkali metal or alkali metal alloy surface of the substrate. In other words, the article can be obtained by any method allowing to apply a protective layer on at least part of an alkali metal or alkali metal alloy surface of the substrate. Preferably, the article is obtained by means of the method of the first aspect of the present disclosure. Alternatively, the article can be obtained by means of a thermal treatment, an ion beam or radiation treatment, a physical vapor deposition treatment, an atomic layer deposition treatment, an electrochemical treatment or a wet chemical treatment.

The article of the present disclosure is advantageously used as (part of) an electrode. The electrode is advantageously an anode. The electrode can be used in a battery or a battery cell. Preferably, the electrode is used in the battery cell as an anode. Particularly preferred is a lithium-ion, a solid state lithium-ion, a Li—S(lithium-sulphur) or a lithium-air battery or battery cell comprising a lithium anode with a protective layer as described herein.

Figure 3:
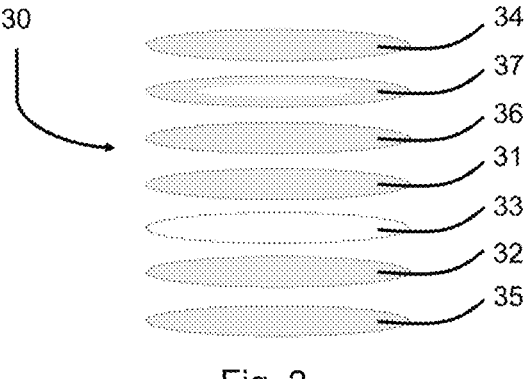
FIG. 3 represents schematically the configuration of a typical coin cell.

FIG. 3 represents an exemplary embodiment of a battery cell 30. The battery cell 30 can have a coin-cell configuration known in the art as a CR2032 type configuration. The battery cell 30 comprises an anode 31 and a cathode 32. The anode 31 is an electrode as described in the present disclosure. The battery cell 30 can further comprise an electrolyte (not shown). The battery cell advantageously comprises a battery separator membrane 33 between the anode 31 and the cathode 32. The cathode can for example be a sulphur-based cathode, such as for a Li—S battery cell. Advantageously, the battery cell 30 further comprises a coin cell lid 34, a coin cell base 35, a spacer 36 and a spring 37. The spacer 36 and the spring 37 provide good contact between the other components 31, 32, 33, 34, 35 of the battery cell 30.

The electrolyte can be a solid electrolyte. A solid electrolyte may be a solid polymer or a solid inorganic glass. For example, the solid electrolyte may be poly(ethylene oxide) (PEO) with lithium salts dispersed in the polymer matrix of the PEO.

Alternatively, the electrolyte can be a liquid electrolyte, advantageously comprising a binder. The electrolyte may be an ionic liquid, optionally comprising an organic component, a salt-solvent mixture, preferably a super-saturated salt-solvent mixture. For example, a liquid electrolyte may be an ionic liquid with lithium salt dissolved therein, or a mixture of an ionic liquid and an organic liquid with a dissolved lithium salt. Examples of liquids that may be used include polyethylene glycol dimethyl ether (PEG DME) or an organic solvent such as dioxolane mixed with dimethyl ether. The liquid electrolyte may comprise a compound of tetraethylene glycol dimethyl ether (PEGDME) and lithium bis(trifluorosulfonyl)imide (LiTFSI). A useful ionic liquid is methyl-butyl pyridinium trifluorosulfonyl imide (PYR14TFSI). The electrolyte may also include lithium bis(trifluoromethanesulfonyl)imide (LiTFSI). In one example, the electrolyte has a 1:1 ratio by weight of PYR14TFSI and PEGDME, with 1 mol/kg LiTFSI. In another example, the electrolyte comprises 1M lithium bis(trifluoromethanesulfonyl)imide (LiTFSI) in dimethoxyethane (DME):1,3-dioxolane (DOL) with a weight ratio of 2:1.

Yet alternatively, the electrolyte may be a gel electrolyte. A gel electrolyte may be a polymer-gelled organic medium. For example, the gel electrolyte may be a mixture of poly(methyl methacrylate) (PMMA), a lithium salt and a small amount of liquid.

The battery separator membrane can be a porous separator membrane. Polymeric battery separator membranes known in the field may be used, such as a porous polypropylene (PP) membrane or a porous polyethylene (PE) membrane. For example, a polypropylene membrane having a thickness of 25 µm and a porosity of 50% may be used. PP and PE are preferred materials because of their chemically inert character. However they are not easily wetted, while it is preferred that the porous separator may absorb the liquid electrolyte. To this end the hydrophobic PP and PE may be treated with a surface treatment or a coating, such as a spray coating, a dip coating or a plasma coating—atmospheric pressure plasma or low pressure plasma. Alternatively, the battery separator membrane may be a ceramic material.

Advantageously, a battery cell as described in the present disclosure has a Coulombic efficiency of at least 85%, preferably at least 90%, more preferably at least 92%, for example at least 95% after 150 cycles of charging and discharging. A "cycle" includes both a (full) charge and a (full) discharge of the battery cell. The Coulombic efficiency is a measure for the internal reactions that can affect the battery life.

As explained in for example "*What do coulombic effiency and capacity retention truly measure? A deep dive into cyclable lithium inventory, limitation type, and redox side reactions.*", A. Tornheim, D. C. O'Hanlon, J. Electrochem. Soc., 167 (11), p. 110520 (2020), and generally known, the Coulombic efficiency (CE) of cycle n is defined as the measured discharge capacity of cycle n, $C_{Dch(n)}$, over the preceding measured charge capacity, $C_{Ch(n)}$. For battery cells assembled in the charged state where the first cycle begins with a discharge step, the Coulombic efficiency can be expressed as follows:

$$CE(\%) = C_{Dch(n+1)} / C_{Ch(n)} * 100\%$$

In an ideal cell without any internal reactions negatively affecting the battery life (also called side-reactions), the lithium transfer and the electron transfer in the battery upon charging and discharging are both lossless and the Coulombic efficiency is 100%. In other words, a higher Coulombic efficiency indicates a battery with less losses and thus a more stable performance of the battery cell.

EXAMPLES

Example 1

A lithium metal substrate was treated with a method of the present disclosure. The plasma jet apparatus of FIG. 1 was used, wherein the lithium metal substrate was mounted on a substrate holder and placed in the afterglow zone 12 of an atmospheric pressure dielectric barrier discharge. Since only a portion of the exposed surface of the lithium metal substrate was contacted with the activated gas during the contacting step, the substrate holder was moved along the x-axis and the y-axis in a controlled way by means of an automated translation table. The plasma jet apparatus was mounted in a closed environment as described above. Nitrogen was added to the closed environment to limit the presence of unwanted impurities, in particular oxygen and water vapor. The gas used for the plasma discharge was a gas mixture of 1 vol. % $N_2O$ in $N_2$ as precursor and $N_2$ as carrier gas. The activated gas comprised both the $N_2O$ in $N_2$ gas mixture and the $N_2$ carrier gas, and comprised 0.1 vol. % $N_2O$ in $N_2$. The total nominal gas flow of $N_2$ carrier gas and precursor gas ($N_2O$ in $N_2$) was 20 slm. The nominal gas flow of precursor gas ($N_2O$ in $N_2$) was varied between 2 and 12 slm and consequently the nominal gas flow of the $N_2$ carrier gas was between 18 and 8 slm. The plasma power was 150-250 W and the frequency was 70 kHz. The total treatment time as defined above was between 10 and 30 minutes, wherein each unit portion of the exposed surface was contacted 10 to 30 times to the activated gas and each contact has a duration of 1 minute. The temperature of the exposed surface was around 80° C. The distance between the proximal end of the discharge lumen and the exposed lithium metal surface of the substrate was 3 mm. The closed environment comprised less than 50 ppm $O_2$.

Figure 7:
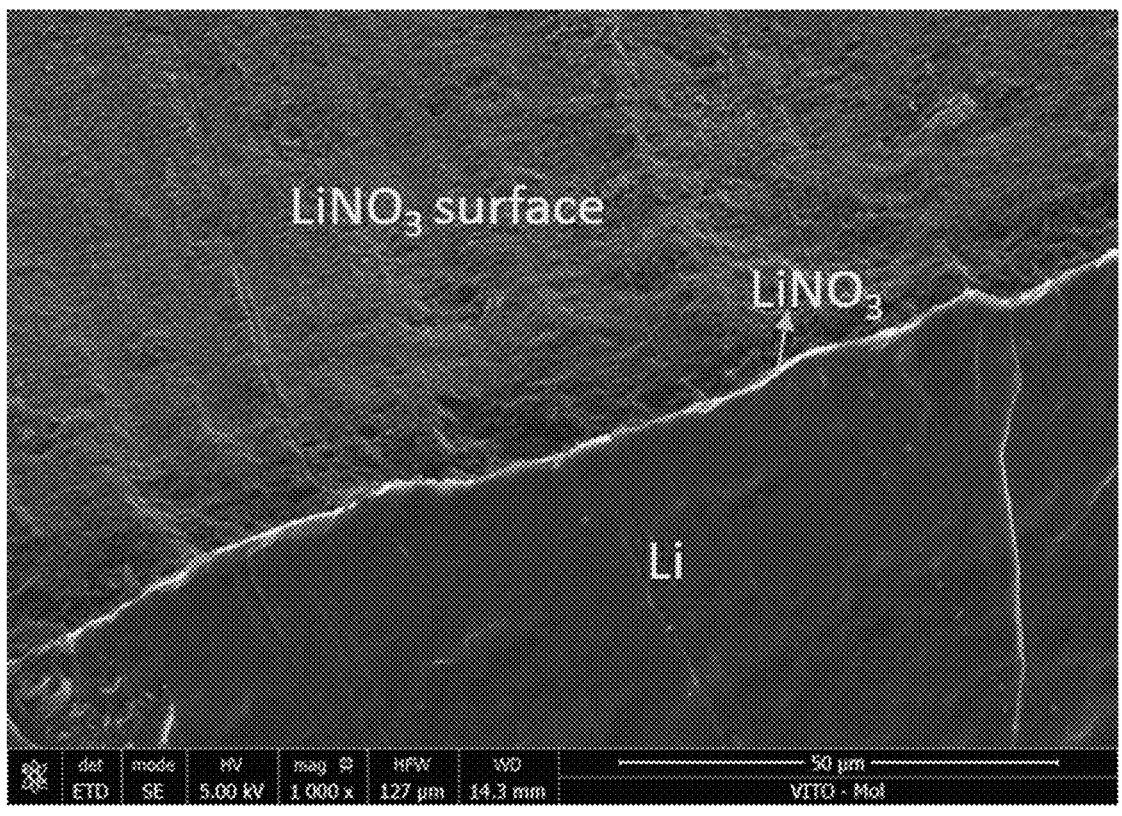
FIGS. 7 and 8 represent SEM-images of the cross-section of an article obtained by methods of the present disclosure.
Figure 8:
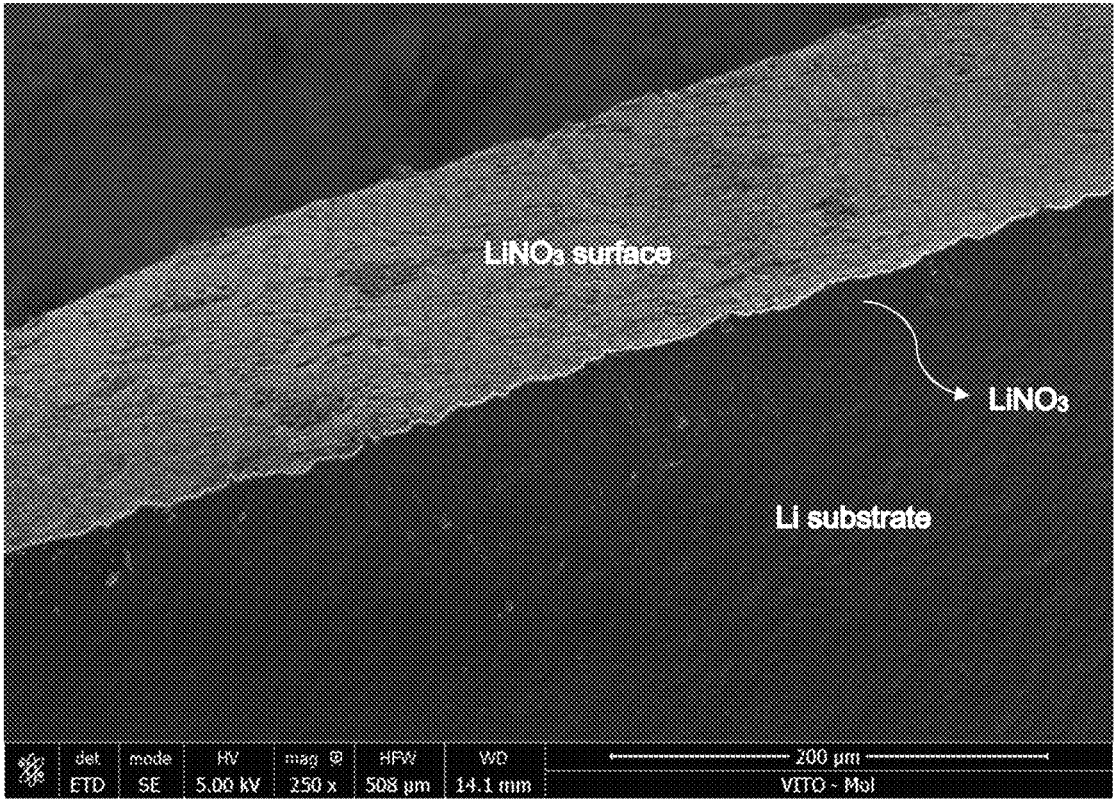
Figure 10:
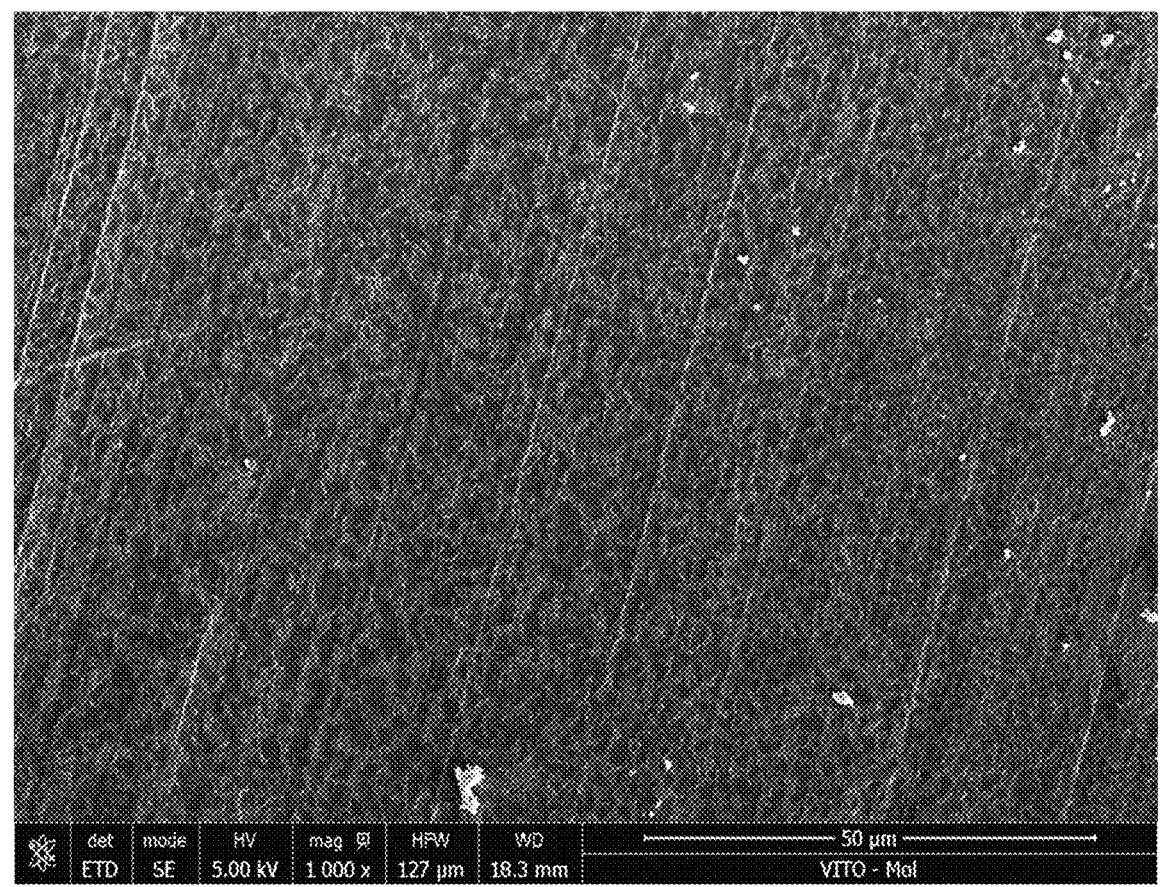
FIG. 10 represents a SEM-image of the surface of an article obtained by methods of the present disclosure.

FIG. 7 and FIG. 8 show SEM-images of the lithium metal substrate (denoted 'Li' and 'Li substrate') and the obtained lithium nitrate layer (denoted 'LiNO₃') directly arranged thereon. Both the top surface (denoted 'LiNO₃ surface') and the cross section (small white line, denoted 'LiNO₃') of the LiNO₃ layer are visible. From visual inspection of the cross section (small white line), it can be appreciated that the LiNO₃ protective layer is continuous over the substrate's surface. This is further confirmed by the SEM-image of FIG. 10, which shows a top-view of the LiNO₃ protective layer, which is very uniform and continuous over the substrate's surface, and devoid of defects such as pinholes. The thickness of the lithium nitrate layer is about 1.4 µm.

Figure 12:
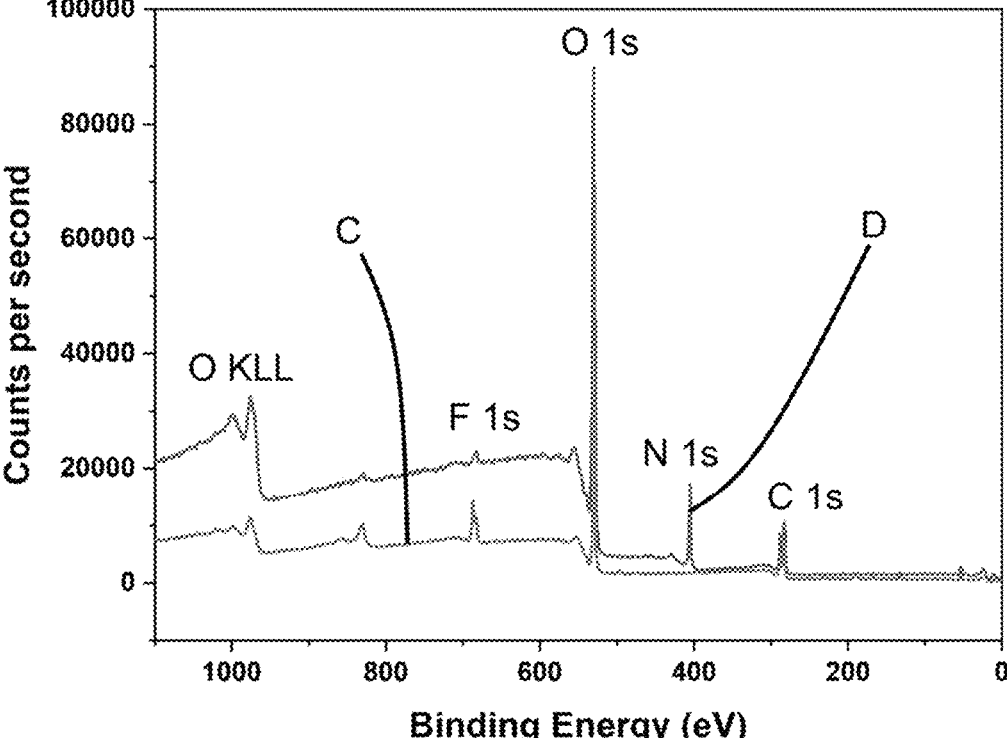
FIG. 12 represents XPS-spectra for an article obtained by methods of the present disclosure and a reference article without protective layer.

FIG. 12 shows the X-ray photoelectron spectroscopy (XPS) analysis for the untreated lithium metal substrate (C) and for the lithium metal substrate with the obtained lithium nitrate layer (D). A PHI-VersaProbe III XPS system with Al source was used for these measurements. The calculated atomic concentrations are based on internal standards in the PHI MultiPak software (Physical Electronics (PHI), USA). A transfer vessel was used to bring the Li samples from an argon-filled glovebox (Ar) to the introduction chamber of the XPS instrument in order to avoid reaction of the samples with atmospheric air and moisture. The position of the intense N1s peak at the binding energy of 408 eV along with the O1s peak at 533 eV in the XPS spectra of the treated lithium metal substrate (D) leads to the confirmation of the presence of LiNO$_3$.

Table 1 shows the atomic concentration of elements determined from XPS analysis of the treated lithium metal substrate (D). Although some carbon was detected, it is clear from FIG. 12 that untreated lithium metal substrate (C) shows a similar C1s peak. The inventors believe that this is due to the 'adventitious carbon' present on the samples as surface impurities that are unavoidable, either during the production, or during storage or transport even in vacuum conditions. Consequently, the inventors believe that the carbon content measured is not related to the presence of carbon-based (organic) impurities formed in the protective layer during formation thereof by the procedure described above.

TABLE 1

| Atomic concentration of elements as measured by XPS | | | |
|---|---|---|---|
| Li1s | C1s | N1s | O1s |
| 17.21 | 11.35 | 16.85 | 54.59 |

Example 2

Li—S battery cells were made to evaluate the charge/discharge characteristics and the cycle life characteristics of the anode comprising a protective layer. The battery cells were produced in a glovebox filled with argon and with an oxygen and moisture level below 1 ppm to reduce the risk for contamination during production.

Battery cells of the type represented by FIG. 3. were made, in which the anode was an electrode obtained through Example 1. A reference battery cell was made in which the anode was lithium metal without any protective layer. For both battery cells, the cathode was prepared in-house by coating a slurry containing appropriate amounts of sulphur, carbon and a binder on an aluminum foil. A polymeric separator was placed between the anode and the cathode. The battery cells were filled with 90 μl of an electrolytic solution comprising 1M lithium bis(trifluoromethanesulfo-nyl)imide (LiTFSI) in dimethoxyethane (DME):1,3-dioxo-lane (DOL) with a weight ratio of 2:1 and without LiNO$_3$ additive. The battery cells were sealed with a pneumatic press.

Figure 9:
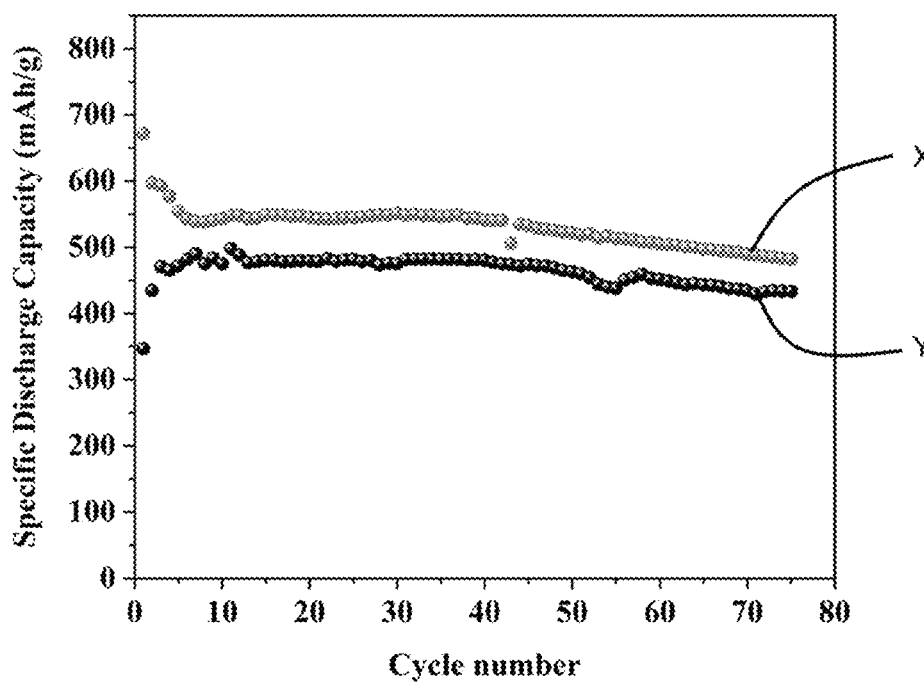
FIG. 9 represents the discharge capacity profiles of a Li—S cell according to FIG. 3 with sulfur cathode and for two different lithium metal anodes, i.e. with and without a protective layer.

The obtained battery cell according to the present disclosure and the reference battery cell were subjected to repeated charging/discharging at 25° C. The specific discharge capacity was measured for each charge/discharge cycle and the results are shown in FIG. 9. FIG. 9 shows the specific discharge capacity results as function of the number of charge/discharge cycles, up to 75 cycles, for the battery cell according to the present disclosure (X) and the reference battery cell (Y). It is clear from FIG. 9 that the specific discharge capacity of the battery cell according to the present disclosure (X) is at any time higher than the capacity of the reference battery cell (Y).

Figure 11:
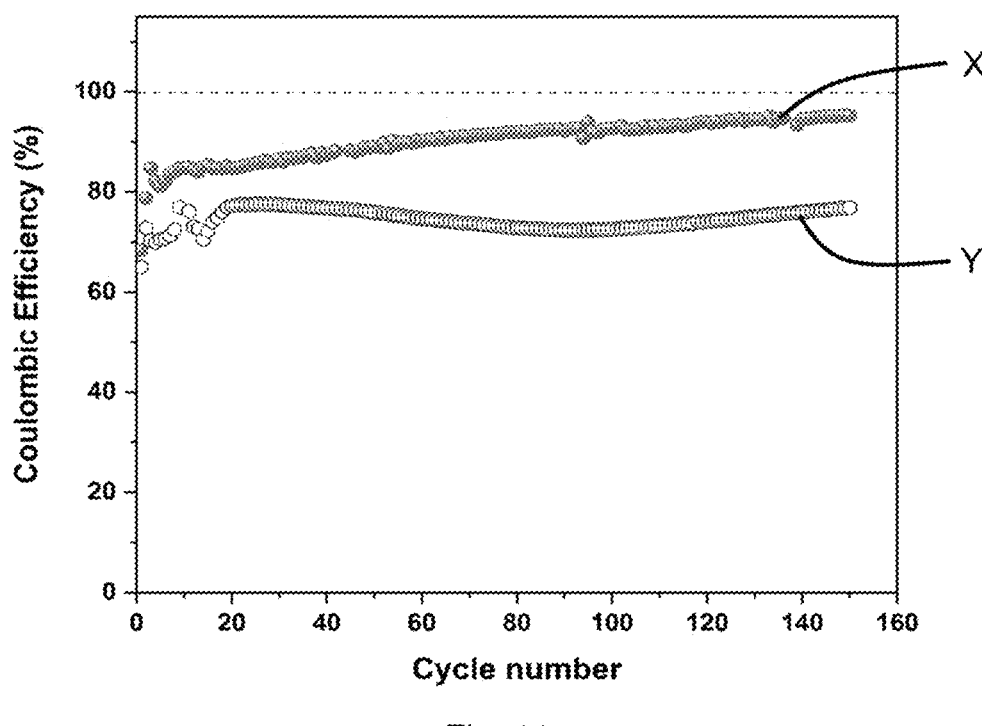
FIG. 11 represents the Coulombic efficiency profile of a Li—S cell according to FIG. 3 with sulphur cathode and for two different lithium metal anodes, i.e. with and without a protective layer.

The Coulombic efficiency was also measured for each charge and discharge cycle up to 150 cycles (one cycle includes one charge and one discharge of the battery cell) and the results are shown in FIG. 11. It is clear from FIG. 11 that the Coulombic efficiency of the battery cell according to the present disclosure (X) is at any time higher than the capacity of the reference battery cell (Y), and reaches even values of 90% and more. For example, after 150 cycles the Coulombic efficiency of the battery cell according to the present disclosure is 95.2%, compared to 76.7% for the reference battery cell.

Example 3

Figure 4:
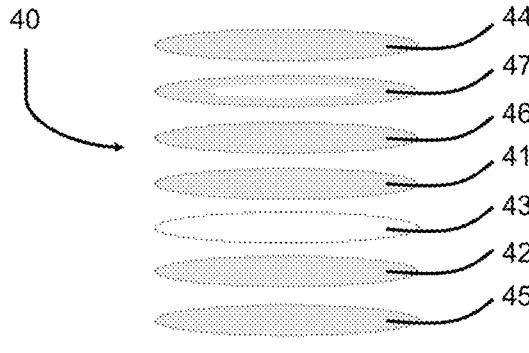
FIG. 4 represents schematically the configuration of a symmetric coin cell.

Li—S symmetric battery cells, as represented in FIG. 4, were made to evaluate how the internal resistance of the anode with and without the protective layer evolves as a function of time. The battery cells were produced in a glovebox filled with argon and with an oxygen and moisture level below 1 ppm to reduce the risk for any contamination during production.

The Li—S symmetric battery cells 40 are similar to the battery cells 30 of FIG. 3, with the difference that both electrodes 41, 42 are identical. For the reference battery cell, the electrodes were alkali metal substrates without any protective layer. For the battery cells 40 according to the present disclosure, the electrodes 41, 42 were obtained through Example 1. A polymeric separator 43 was placed between the electrodes 41 and 42. The battery cells 40 were filled with 90 μl of an electrolytic solution containing 1M lithium bis(trifluoromethanesulfonyl)imide (LiTFSI) in dimethoxyethane (DME):1,3-dioxolane (DOL) with a weight ratio of 2:1. Further, a coin cell lid 44 and a coin cell base 45 were provided, as well as a spacer 46 and a spring 47 to ensure good contact between the components of the cell 30. The battery cells 40 were sealed with a pneumatic press.

Electrochemical impedance spectroscopy (EIS) was performed on the reference symmetrical battery cell and the symmetrical battery cell according to the present disclosure. Similarly, EIS was also performed on typical Li—S battery cells according to FIG. 3, containing a sulphur cathode and the plasma-treated or reference lithium anode. A 10 mV AC potential was applied to the cell during the frequency sweep. The frequency sweep was performed from 300 kHz to 0.01 Hz.

Figure 5A:
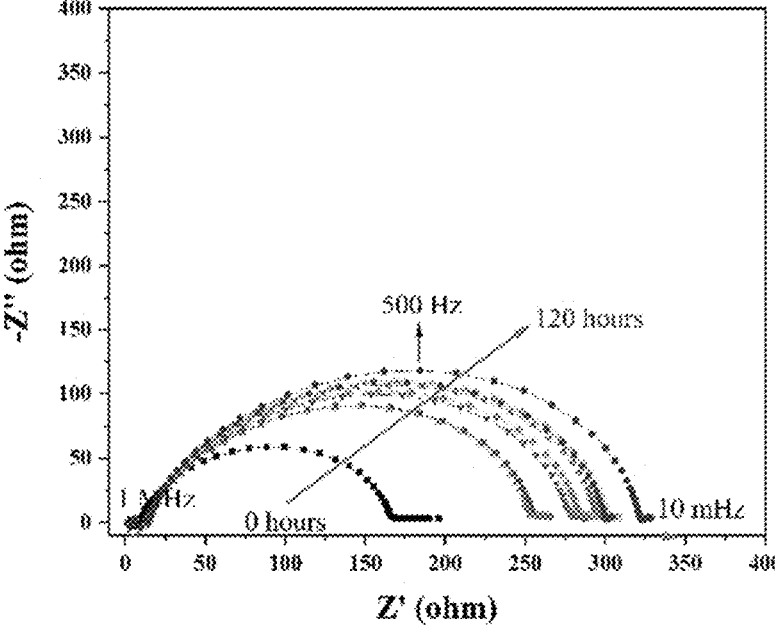
FIGS. 5A and 5B represent the EIS results of a lithium metal substrate without protective layer (FIG. 5A) and with a protective layer (FIG. 5B)
Figure 5B:
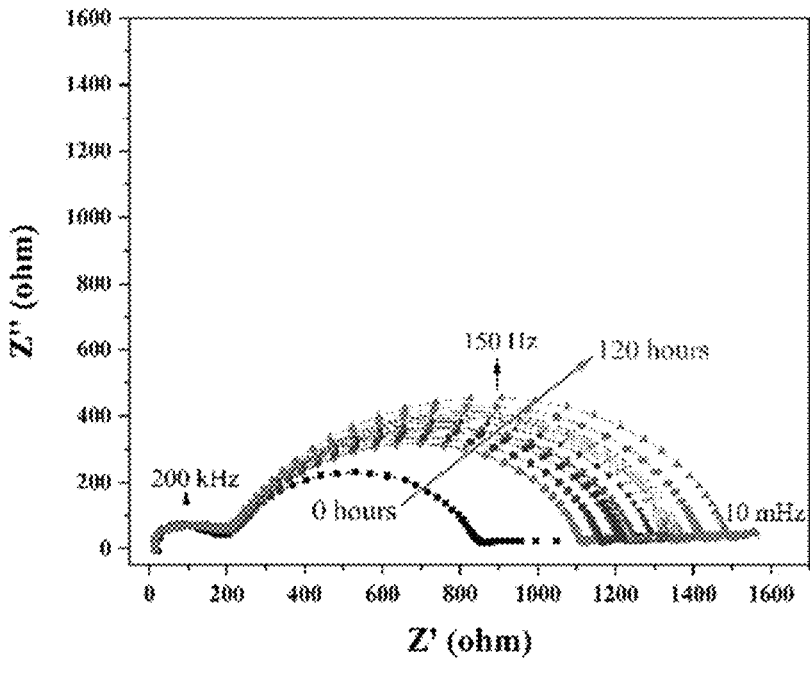

FIG. 5A and FIG. 5B respectively show the Nyquist plot of the impedance data for both battery cells. In the Nyquist plots the impedance data from each frequency point is plotted. The abscissa (x-axis) shows the real part of the impedance data and the ordinate (y-axis) shows the imaginary part of the impedance data. FIGS. 5A and 5B show the results at the start of the experiment (time 0) up to 120 hours of testing, represented in 6 hour intervals (results at time 0, after 6 h, 12 h, 18 h, 24 h, and so on up to 120 h).

The impedance spectra in FIG. 5B show a semi-circle in the high-frequency region that represents a surface layer resistance of 200 Ohm. The larger semi-circle in the low-frequency region corresponds to the charge-transfer resistance. On the contrary, the impedance spectra of the reference cell, shown in FIG. 5A, consist of only one semi-circle which corresponds to the charge-transfer resistance, indicating the absence of a surface layer resistance. The presence of a surface layer resistance in FIG. 5B indicates that the protective layer provides an excellent initial protection of the electrodes, leading to relatively higher surface layer resistance at open circuit potential. When comparing the evolution of the impedance spectra from time 0 hours up to 120 hours of testing, it is clear from FIGS. 5A and 5B that a significant surface layer resistance is formed in the symmetric cell of FIG. 4, made of electrodes comprising the protective layer of Example 1. It is also observed that the surface layer resistance remains stable over time indicating that the protective layer continues to provide an excellent protection.

Example 4

The symmetric battery cells 40 of example 3 were used to evaluate how the internal resistance of the electrode evolves as a function of time. The internal resistance of the electrode is evaluated by means of evaluating the lithium plating/ stripping behavior of the electrode. The lithium plating/ stripping behavior is evaluated by monitoring the evolution of the overpotential over time when a constant current of 2 $mA/cm^2$ is applied. An Ametek PARSTAT PMC-200 multichannel potentiostat was used to perform these measurements.

Figure 6:
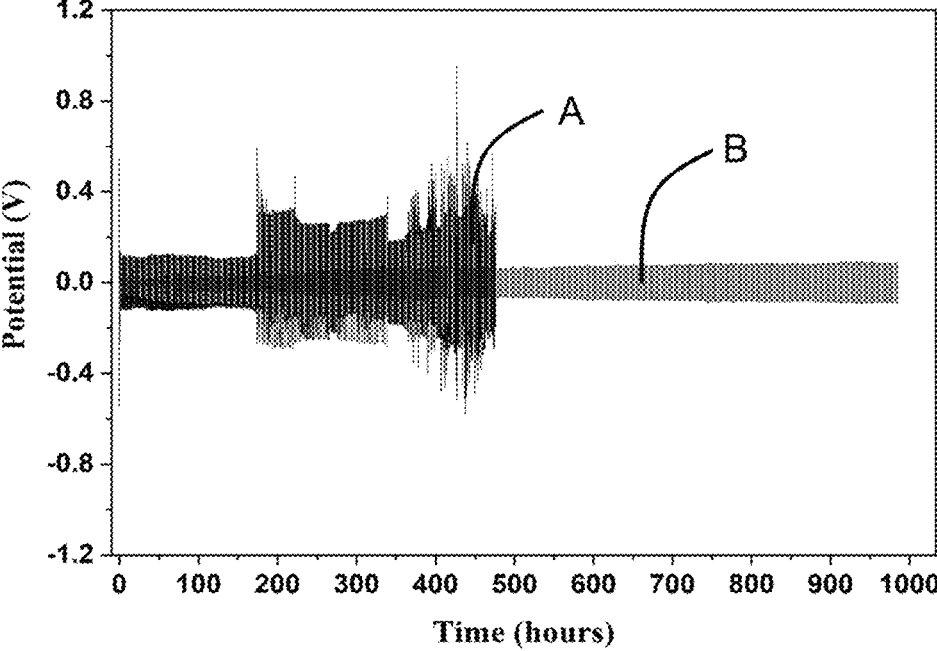
FIG. 6 represents the stability of a lithium metal anode with and without a protective layer upon repeated plating and stripping of the lithium.

FIG. 6 shows the potential values measured for a duration of about 1000 hours for the reference battery cell (A, black) and for the battery cell of the present disclosure (B, grey). Up to a test duration of around 175 hours, the potential values represent the deterioration of the lithium metal. A higher absolute potential value, and thus a wider fluctuation of the potential values, indicates a larger deterioration. Hence it is clear that the electrode comprising a lithium metal substrate without protective layer shows more deterioration than the electrode of the present disclosure. For test durations of 175 hours and more, lithium dendrite formation is noticed in the battery cell, leading to instabilities due to short circuiting. The absolute potential value and the stability of the measurement are a measure for the degree of dendrite formation. A lower dendrite formation indicates a better functioning of the battery cell over time, as dendrite formation is an unwanted effect. It is clear from FIG. 6 that the absolute potential values are higher and that the potential signal is less stable for the reference battery cell than for the battery cell of the present disclosure. Peak values are visible and become more frequent for test durations longer than about 350 hours. The protective layer thus provides clear protection against lithium dendrite formation. The absolute potential value of the battery cell of the present disclosure (B) after 1000 hours remains very stable and does not increase beyond the absolute potential value of the reference battery cell at the beginning of the testing, which indicates an excellent protection against lithium dendrite formation.

Example 5

LTO-Li battery cells were made to evaluate the charge/ discharge characteristics and the cycle life characteristics of the anode comprising a protective layer. The battery cells were produced in a glovebox filled with argon and with an oxygen and moisture level below 1 ppm to reduce the risk for contamination during production.

Battery cells of the type represented by FIG. 3. were made, in which the anode was an electrode obtained through Example 1. A reference battery cell was made in which the anode was lithium metal without any protective layer. For both battery cells, the cathode was a $Li_4Ti_5O_{12}$ (commonly referred to as LTO) electrode. A polymeric separator was placed between the anode and the cathode. The battery cells were filled with 60 µl of an electrolytic solution comprising 1M lithium hexafluorophosphate ($LiPF_6$) in EC (ethylene carbonate)/DMC (dimethyl carbonate) (1:1 weight ratio) and without $LiNO_3$ additive. The battery cells were sealed with a pneumatic press.

LTO is known to have a very stable voltage vs. capacity profile, showing a flat charge/discharge plateau at 1.5 V, and is known for its 'SEI-free' cycling behavior. Consequently, LTO-Li battery cells as described above allow to evaluate the anodes (with and without protective layer) with minimal influence of the counter electrode.

Figure 13:
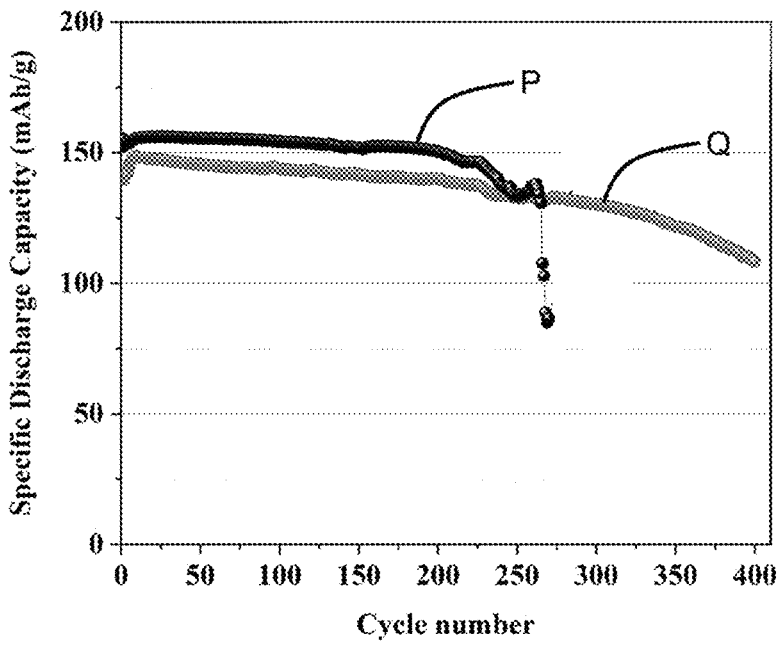
FIG. 13 represents the discharge capacity profiles of a LTO cell according to FIG. 3 with LTO cathode and for two different lithium metal anodes, i.e. with and without a protective layer at 2 C rate.

The obtained LTO-Li battery cell according to the present disclosure and the LTO-Li reference battery cell were subjected to repeated charging and discharging at 25° C. by applying a high current density of 2.5 $mA/cm^2$, corresponding to 2 C rate (one charging or discharging step takes about 30 minutes). FIG. 13 shows the specific discharge capacity of the battery cell according to the present disclosure (Q) and the reference battery cell (P) as measured during each charge/discharge cycle. It is clear from FIG. 13 that even though the specific discharge capacity of the battery cell according to the present disclosure (Q) is slightly lower than the capacity of the reference battery cell (P), it remains relatively stable until 400 cycles (one cycle stands for one charge and one discharge of the battery cell), whereas the capacity of the reference battery cell (P) drops significantly after about 250 cycles.

Figure 14:
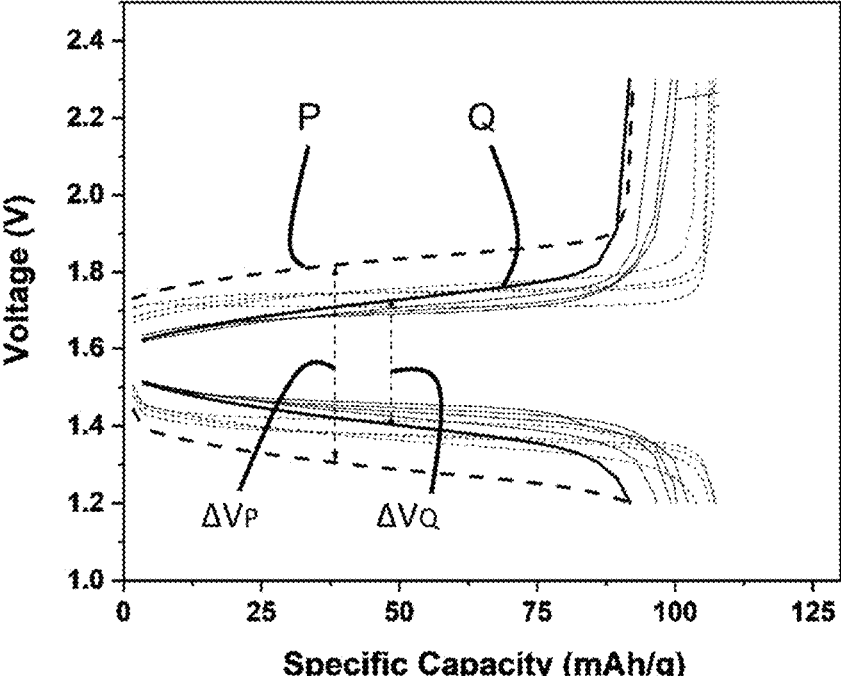
FIG. 14 represents the voltage and voltage hysteresis of a LTO cell according to FIG. 3 with LTO cathode and for two different lithium metal anodes, i.e. with and without a protective layer at 2 C rate.

This drop of the discharge capacity can be explained by the voltage hysteresis ($\Delta V$) between charge and discharge. FIG. 14 shows the voltage hysteresis for the battery cell according to the present disclosure ($\Delta V_P$) and the reference battery cell ($\Delta V_Q$) in the $250^{th}$ cycle, from which it is clear that the voltage hysteresis increases rapidly in the reference cell (P) when compared to the battery cell according to the present disclosure (Q). When the cell is discharged, lithium from the anode is electrochemically stripped and intercalated into the LTO electrode. On charging, the lithium is extracted from the LTO electrode and deposited again on the anode. In this context, the increased hysteresis in the LTO-Li reference battery cells can be associated with the increasing charge-transfer resistance of the battery cell owing to the formation of a thicker SEI layer formed on the lithium metal. The relatively lower voltage hysteresis in the battery cell according to the present disclosure indicates a better charge transport through the $LiNO_3$ protective layer.

The invention claimed is:

1. A method for applying a protective layer on at least part of an exposed surface of a substrate, wherein the exposed surface comprises an alkali metal or an alkali metal alloy, the method comprising:
   (i) activating a gas by means of a plasma discharge, to obtain an activated gas,
   (ii) contacting the exposed surface with the activated gas, wherein a protective layer is formed on at least part of the exposed surface,
wherein the gas comprises a nitrogen-comprising compound in an amount, such that the protective layer comprises at least 60 mol % of a corresponding alkali metal nitrate, as measured by X-ray photoelectron spectroscopy.

2. The method of claim 1, wherein the gas comprises nitrous oxide ($N_2O$).

3. The method of claim 1, wherein the gas comprises $N_2$.

4. The method of claim 2, wherein the gas comprises $N_2O$ in an amount between 0.05 vol. % and 99.95 vol. %.

5. The method of claim 1, the gas comprises $O_2$ in an amount equal to or lower than 0.5 vol. %.

6. The method of claim 1, wherein the alkali metal is lithium (Li), or wherein the alkali metal alloy comprises at least 5 wt. % lithium based on a total weight of the alkali metal alloy, and wherein the corresponding alkali metal nitrate is lithium nitrate ($LiNO_3$).

7. The method of claim 1, wherein during contacting the exposed surface with the activated gas, a temperature of the exposed surface is equal to or lower than 700° C.

8. The method of claim 1, wherein the plasma discharge is a dielectric barrier plasma discharge, a microwave plasma discharge, a radio frequency plasma discharge, an inductive coupled plasma discharge, an arc plasma discharge, or a DC plasma discharge.

9. The method of claim 1, wherein the plasma discharge has a plasma power density between 20 $Wh/m^2$ and 50 $Wh/cm^2$ of treated surface area.

10. The method of claim 1, wherein the method is carried out in a plasma equipment mounted in a closed environment, wherein the closed environment comprises an inert gas, and wherein a pressure of the closed environment is above atmospheric pressure.

11. An article, comprising:

a substrate having an interface surface comprising an alkali metal or an alkali metal alloy; and a protective layer arranged on at least part of the interface surface;

wherein the protective layer is conductive to ions of the corresponding alkali metal and comprises at least 60 mol % of a corresponding alkali metal nitrate, as measured by X-ray photoelectron spectroscopy.

12. The article of claim 11, wherein the protective layer comprises at most 40 mol % of a corresponding alkali metal oxide, as measured by X-ray photoelectron spectroscopy.

13. The article of claim 11, wherein the protective layer has a thickness between 5 nm and 500 μm.

14. The article of claim 11, wherein the alkali metal is lithium (Li), or wherein the alkali metal alloy comprises at least 5 wt. % lithium based on a total weight of the alkali metal alloy, and wherein the corresponding alkali metal nitrate is lithium nitrate ($LiNO_3$).

15. The article of claim 11, wherein the protective layer consists essentially of the corresponding alkali metal nitrate and comprises substantially no impurities, as measured by X-ray photoelectron spectroscopy.

16. An electrode comprising the article of claim 11.

17. A battery cell comprising the electrode of claim 16, wherein the electrode is an anode.

18. The battery cell according to claim 17, wherein the battery cell is configured to have a Coulombic efficiency of at least 85% after 150 charging and discharging cycles.

19. The method of claim 2, wherein the gas comprises a mixture of $N_2$ and $N_2O$.

20. The method of claim 19, further comprising generating a plasma discharge in a nitrogen carrier gas and wherein (ii) activating the gas comprises injecting a precursor comprising the mixture of $N_2$ and $N_2O$ in the plasma discharge to obtain the activated gas.

* * * * *